United States Patent
Mulla et al.

(10) Patent No.: US 9,079,536 B2
(45) Date of Patent: Jul. 14, 2015

(54) SLIDING GRIP CLIP FOR MOUNTING A SKI RACK

(71) Applicant: ILLINOIS TOOL WORKS INC., Glenview, IL (US)

(72) Inventors: Dastageer H. Mulla, Maharashtra (IN); Allande Johnson, Tamilnadu (IN); Mahantesh Gokavi, Maharashtra (IN)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 14/171,581

(22) Filed: Feb. 3, 2014

(65) Prior Publication Data

US 2014/0219709 A1    Aug. 7, 2014

(51) Int. Cl.
*B60R 9/04* (2006.01)
*F16B 37/08* (2006.01)
*B60R 9/058* (2006.01)

(52) U.S. Cl.
CPC .............. *B60R 9/058* (2013.01); *F16B 37/0842* (2013.01); *B60R 9/04* (2013.01); *F16B 37/08* (2013.01); *Y10T 403/32532* (2015.01)

(58) Field of Classification Search
CPC ........ B60R 9/04; F16B 37/08; F16B 37/0842
USPC ........................... 224/309; 411/508, 433, 437; 24/289–297
See application file for complete search history.

(56) References Cited

U.S. PATENT DOCUMENTS

| | | | | |
|---|---|---|---|---|
| 4,556,352 A | * | 12/1985 | Resnicow | 411/433 |
| 5,039,266 A | * | 8/1991 | Nagayoshi et al. | 411/433 |
| 5,339,501 A | * | 8/1994 | Gugle et al. | 24/581.1 |
| 5,816,762 A | * | 10/1998 | Miura et al. | 411/433 |
| 5,941,670 A | * | 8/1999 | Sano et al. | 411/433 |
| 6,050,766 A | * | 4/2000 | Kies et al. | 411/437 |
| 6,994,499 B2 | * | 2/2006 | Hoffmann et al. | 411/84 |
| 7,128,514 B1 | * | 10/2006 | Le Beau | 411/433 |
| 7,134,821 B2 | * | 11/2006 | Clinch et al. | 411/171 |
| 7,178,206 B2 | * | 2/2007 | Kuhnle et al. | 24/297 |
| 7,891,151 B2 | * | 2/2011 | Sano | 52/506.05 |
| 8,118,529 B2 | * | 2/2012 | Crane et al. | 411/546 |
| 8,123,091 B2 | * | 2/2012 | Kiyota | 224/326 |
| 8,443,493 B2 | * | 5/2013 | Seidel | 24/297 |
| 8,459,918 B2 | * | 6/2013 | Lin et al. | 411/112 |
| 8,627,989 B2 | * | 1/2014 | Aftanas et al. | 224/326 |
| 8,894,340 B2 | * | 11/2014 | Kamiya et al. | 411/508 |
| 8,944,736 B2 | * | 2/2015 | Figge et al. | 411/546 |
| 2004/0117951 A1 | * | 6/2004 | Nishimura et al. | 24/289 |
| 2013/0299539 A1 | * | 11/2013 | Bocker et al. | 224/309 |
| 2014/0097218 A1 | * | 4/2014 | Bittner, Norfried Achim | 224/309 |

* cited by examiner

Primary Examiner — Justin Larson
(74) Attorney, Agent, or Firm — Lowe Hauptman & Ham LLP

(57) ABSTRACT

A slidable clip for mounting on a stud, the slidable clip comprising a hollow block with one or more horizontal resile hook protruded from surface of the hollow block. A slidable block with one or more slot located on surface of the slidable block and one or more vertical resile hook protruded from surface of the slidable block, wherein the slidable block slides inside the hollow block to form an axial hole which is through the hollow block and the slidable block such that when the slidable clip is mounted on the stud through the axial hole, the horizontal resile hook hooks at a desired location on to the slot and the vertical resile hook hooks at a desired location on to the stud.

11 Claims, 3 Drawing Sheets
(3 of 3 Drawing Sheet(s) Filed in Color)

SLIDING GRIP CLIP FOR MOUNTING A SKI RACK

RELATED APPLICATIONS

The present application claims priority of Indian Application Number 482/CHE/2013 filed Feb. 4, 2013, the disclosure of which is hereby incorporated by reference herein in its entirety.

FIELD OF INVENTION

The present invention generally relates to a slidable clip and the present invention particularly relates to a slidable clip for mounting a decorative roof rail trim of a vehicle on a stud.

BACKGROUND OF THE INVENTION

The existing process and the machinery involved in mounting a roof rail trim on to a vehicle top is cumbersome and it consumes a lot of time in mounting the roof rail trim on to a vehicle top. Moreover, the existing technique involves too many sub assemblies to mount the roof rail trim which adds up to the time and cost to the entire assembly process. Moreover the present technique involves making hole on the vehicle's roof top which attributes to leakage of water into the vehicle from the roof top of the vehicle.

Also, variations due to position of punched hole in the roof panel are critical and the current process is limited to accommodate such variations.

Also, bolts and washer required for fastening Roof Trim which adds up additional hardware.

The existing process requires a weld nut on the roof trim for fitment of bolt through which water passes adding to leakage issues. Though sealants are provided, it doesn't eliminate the water entry completely. Fitment with the bolt and washer adds up ergonomic issues.

The existing process requires a hole in the roof trim to provide access to bolt which are covered with additional caps. This hampers the aesthetic finish in the visible surface of the roof trim as well as adds up the part numbers. Multiple Steps are involved with this assembly, which increases assembly tag time on vehicle line, involving locating the roof trim in rail slot, locating the roof trim to guide the mounting weld nut holes, assembling the bolt and washer into the roof holes with a drive tool and drive them into weld nut and assembling the caps to hide the bolt assembly location.

Accordingly, there is a need for an invention which will overcome the drawbacks described herein which would provide a simple process to mount the roof rail trim on to the vehicle and be effective and less cumbersome. The present invention accordingly provides a slidable clip to mount the roof rail trim on to the vehicle.

OBJECT OF THE INVENTION

One object of the present invention is to provide a slidable clip to mount a roof rail trim on a stud which is capable of sliding on to the stud based on its location in the roof ditch and to get locked on to the stud at a desirable position.

SUMMARY OF THE INVENTION

The present invention provides a slidable clip for mounting on a stud. The slidable clip comprises a hollow block with one or more horizontal resile hook protruded from surface of the hollow block. The slidable clip comprises a slidable block with one or more slot located on surface of the slidable block. The slidable block comprises one or more vertical resile hook protruded from surface of the slidable block. The slidable block slides inside the hollow block to form an axial hole which is through the hollow block and the slidable block such that when the slidable clip is mounted on the stud through the axial hole, the horizontal resile hook hooks at a desired location on to the slot and the vertical resile hook hooks at a desired location on to the stud.

BRIEF DESCRIPTION OF DRAWINGS

The patent or application file contains at least one drawing executed in color. Copies of this patent or patent application publication with color drawing(s) will be provided by the Office upon request and payment of the necessary fee."

The features of the present invention will become more clear and apparent from the following description which refers to the accompanying drawings in which.

DETAILED DESCRIPTION OF THE INVENTION

The present invention will be described herein below with reference to the accompanying drawings.

Figure 1:
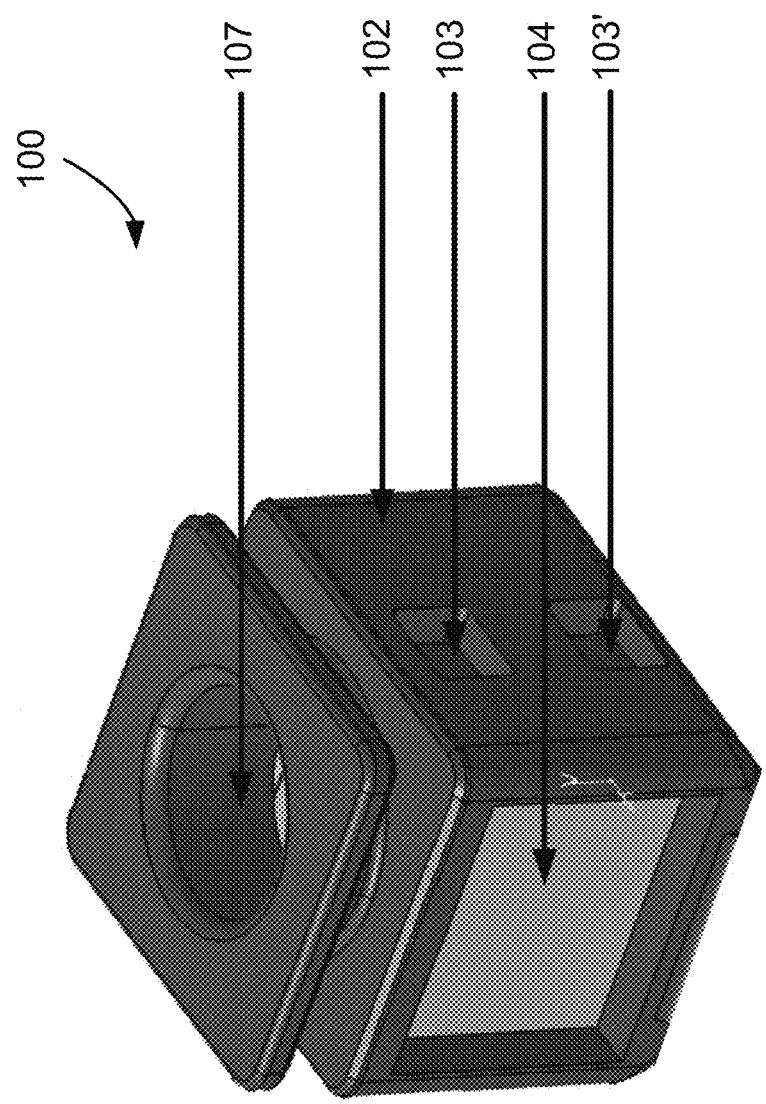
FIG. 1 illustrates a slidable clip for mounting on a stud in accordance with an exemplary embodiment of the present invention.
Figure 2:
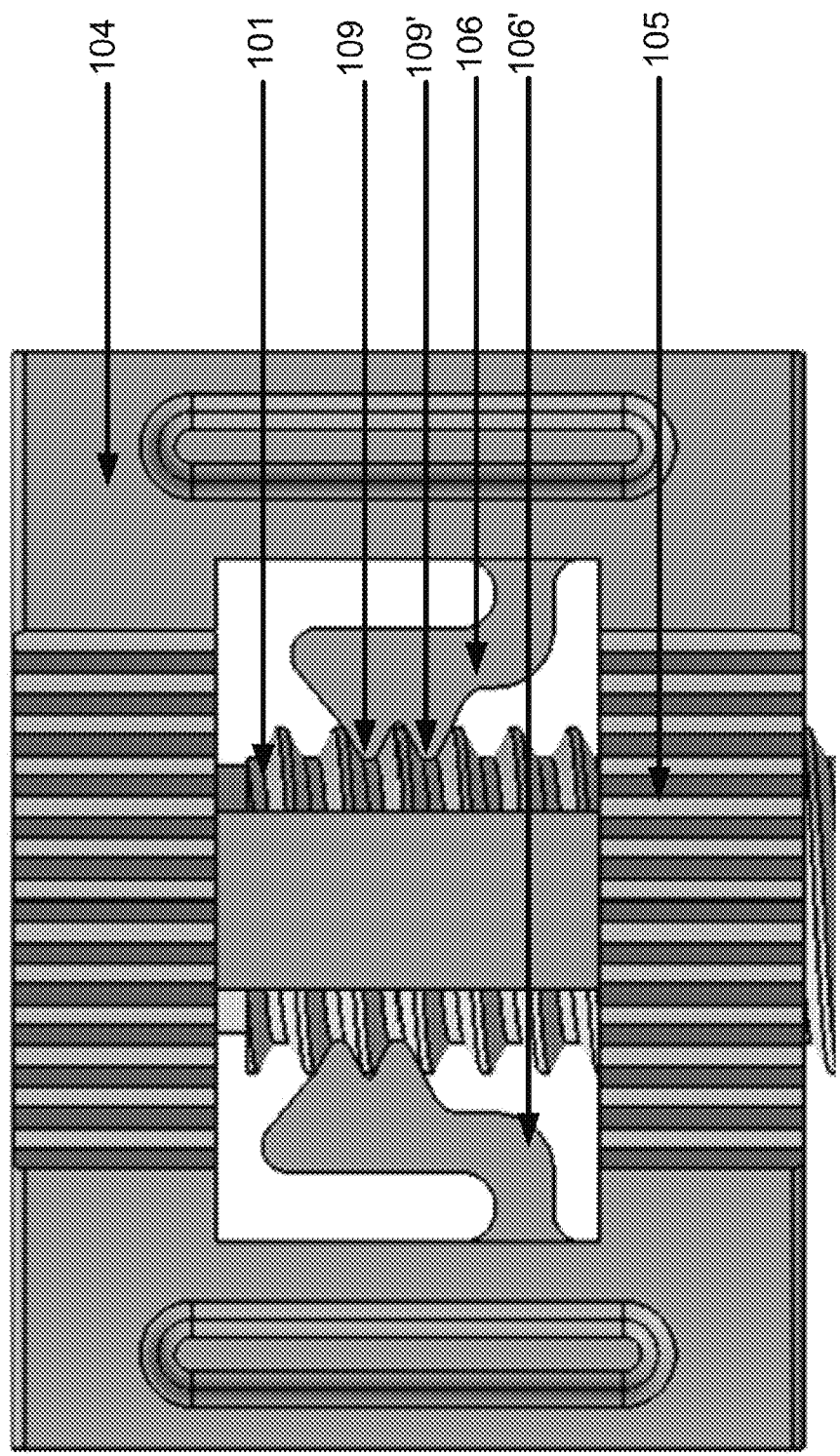
FIG. 2 illustrates a sliding block of a slidable clip in accordance with another exemplary embodiment of the present invention.
Figure 3:
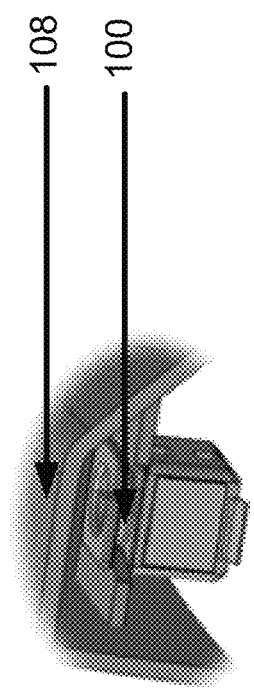
FIG. 3 illustrates a slidable clip housed inside a roof trim in accordance with yet another exemplary embodiment of the present invention.

Referring to FIG. 1, a slidable clip (100) for mounting on a stud (101) is illustrated in accordance with an exemplary embodiment of the present invention; Referring to FIG. 2, a sliding block of a slidable clip (100) is illustrated in accordance with yet another exemplary embodiment of the present invention; and Referring to FIG. 3, a slidable clip (100) housed inside a roof trim (108) is illustrated in accordance with yet another exemplary embodiment of the present invention.

The slidable clip (100) for mounting on a stud (101) comprises a hollow block (102) with one or more horizontal resile hook (103 103') protruded from surface of the hollow block (102). These resile hooks are resilient in nature and has a springy action. Several such resile hooks can be protruded from the surface of the hollow block (102). The hollow block (102) is hollow enough to accommodate a slidable block (104) having one or more slot (105) located on surface of the slidable block (104). One or more vertical resile hook (106 106') are protruded from surface of the slidable block (104). The slidable block (104) can slide inside the hollow block (102) to form an axial hole (107) which is through the hollow block (102) and the slidable block (104) such that when the slidable clip (100) is mounted on the stud (101) through the axial hole (107), the horizontal resile hook (103 103') hooks at a desired location on to the slot (105) and the vertical resile hook (106 106') hooks at a desired location on to the stud (101). The vertical resile hook (106 106') has one or more hook tip (109 109') to strengthen the hooking on the stud (101).

The horizontal resile hook (103 103') hooks on to the slot (105) of the sliding block and the vertical resile hooks (106 106') on to the stud (101).

The surface on which the vertical resile hook (106 106') protrudes is inner vertical surfaces of the slidable block (104)

and the vertical resile hook (106 106') that are located on the opposite surfaces are located at different levels to the other to accommodate and hook to the stud (101). The vertical resile hooks (106 106') which are facing each other that is which are opposite to each other are located at different levels such that it can lock on to the stud (101).

The slot (105) is an array of slots (105) and the surface on which the array of slots (105) is located is outer vertical surfaces of the slidable block (104). The slots (105) can be an array of slots (105) and these slots (105) are located in outer vertical surfaces of the slidable block (104). The slots (105) are evenly distributed on the surface of the slidable block (104).

The surface on which the horizontal resile hook (103 103') protrudes is inner vertical surfaces of the hollow block (102) and the horizontal resile hooks (103 103') located on the opposite surfaces are located laterally opposite to the other such that irrespective of the direction in which the slidable block (104) slides, at least any one of the horizontal hook hooks on to the slot (105).

The horizontal resile hook (103 103') and the vertical resile hook (106 106') are snap fit hooks. The hollow block (102) and the slidable block (104) can have a cubical shape construction.

In the slidable clip (100) the slidable block (104) hooks on to the hollow block (102) at a desired position in horizontal plane and the hollow block (102) hooks on the stud (101) at a desired position in the vertical plane thereby locking the slidable clip (100) intact with the stud (101) by accommodating the variations in the position of the stud.

The stud (101) is a threaded stud (101) so that the vertical resile hook (106 106') can hook on to the thread of the stud (101). The slidable clip (100) is adopted for a roof rail trim assembly in a vehicle and the slidable clip (100) can be housed inside a roof trim (108).

The present invention also achieves one or many such features such as providing a single step assembly in line reducing the assemble time by eliminating other cumbersome processes and also accommodates stud welding variation in the X and Y axis on the roof surface of the vehicle. The trim (108) assembly with the slidable clip (100) is assembled by locating and pushing the slidable clip (100) in the slot (105) with welded stud (101). In roof application, this procedure eliminates the roof hole, weld nut and sealant for waterproofing thereby eliminating completely the Leakage Issues. This also eliminates the special tool for tightening the bolt. This also eliminates the other accessories such as caps etc. to be used to cover the visible stud area in the roof trim.

We claim:

1. A slidable clip for mounting on a stud, the slidable clip comprising:
    a hollow block with one or more horizontal resile hook protruded from surface of the hollow block;
    a slidable block with one or more slot located on surface of the slidable block; and
    one or more vertical resile hook protruded from surface of the slidable block, wherein the slidable block slides inside the hollow block to form an axial hole which is through the hollow block and the slidable block such that when the slidable clip is mounted on the stud through the axial hole, the horizontal resile hook hooks at a desired location on to the slot and the vertical resile hook hooks at a desired location on to the stud.

2. The slidable clip as claimed in claim 1, wherein the surface on which the vertical resile hook protrudes is inner vertical surfaces of the slidable block and the vertical resile hook that are located on the opposite surfaces are located at different levels to the other to accommodate and hook to the stud.

3. The slidable clip as claimed in claim 1, wherein the vertical resile hook has one or more hook tip.

4. The slidable clip as claimed in claim 1, wherein the slot is an array of slots and the surface on which the array of slots is located is outer vertical surfaces of the slidable block.

5. The slidable clip as claimed in claim 1, wherein the surface on which the horizontal resile hook protrudes is inner vertical surfaces of the hollow block and the horizontal resile hooks located on the opposite surfaces are located laterally opposite to the other such that irrespective of the direction in which the slidable block slides, at least any one of the horizontal hook hooks on to the slot.

6. The slidable clip as claimed in claim 1, wherein the horizontal resile hook and the vertical resile hook are snap fit hooks.

7. The slidable clip as claimed in claim 1, wherein the hollow block and the slidable block have a cubical shape construction.

8. The slidable clip as claimed in claim 1, wherein the slots are evenly distributed on the surface of the slidable block.

9. The slidable clip as claimed in claim 1, wherein the stud is a threaded stud.

10. The slidable clip as claimed in claim 1, wherein the slidable clip is adopted for a roof rail trim assembly in a vehicle and the slidable clip can be housed inside a roof trim.

11. The slidable clip as claimed in claim 1, wherein the slidable block hooks on to the hollow block at a desired position in horizontal plane and the hollow block hooks on the stud at a desired position in the vertical plane thereby locking the slidable clip intact with the stud by accommodating the variations in the position of the stud.

* * * * *